US 12,056,321 B2

(12) United States Patent
Jain et al.

(10) Patent No.: US 12,056,321 B2
(45) Date of Patent: Aug. 6, 2024

(54) APPARATUS TO REDUCE NEGATIVE PIXEL FROM CAPACITIVE TOUCH

(71) Applicant: Apple Inc., Cupertino, CA (US)

(72) Inventors: Karan S. Jain, San Jose, CA (US); Santosh Pokhrel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/446,835

(22) Filed: Aug. 9, 2023

(65) Prior Publication Data

US 2024/0094853 A1 Mar. 21, 2024

Related U.S. Application Data

(60) Provisional application No. 63/376,421, filed on Sep. 20, 2022.

(51) Int. Cl.
*G06F 3/044* (2006.01)
(52) U.S. Cl.
CPC .......... *G06F 3/0443* (2019.05); *G06F 3/0445* (2019.05)
(58) Field of Classification Search
CPC ............................................. G06F 3/044–0448
See application file for complete search history.

(56) References Cited

U.S. PATENT DOCUMENTS

| 7,151,528 | B2 * | 12/2006 | Taylor | G06F 3/0219 345/169 |
| 7,580,030 | B2 * | 8/2009 | Marten | G06F 3/0446 345/173 |
| 7,859,521 | B2 * | 12/2010 | Hotelling | G06F 3/04166 345/173 |
| 7,995,041 | B2 * | 8/2011 | Chang | G06F 3/0443 345/173 |
| 8,570,301 | B2 | 10/2013 | Land et al. | |
| 8,830,180 | B2 * | 9/2014 | Yilmaz | G06F 3/0446 345/173 |
| 9,075,483 | B2 | 7/2015 | Westerman et al. | |
| 9,152,283 | B2 * | 10/2015 | Shepelev | G06F 3/0412 |
| 9,158,407 | B2 | 10/2015 | Coulson et al. | |
| 9,389,258 | B2 * | 7/2016 | Kravets | G01R 27/2605 |
| 9,495,042 | B2 | 11/2016 | Yilmaz | |
| 9,651,814 | B2 | 5/2017 | Zhou | |
| 9,652,072 | B2 * | 5/2017 | Shepelev | G06F 3/0445 |

(Continued)

*Primary Examiner* — Gene W Lee
(74) *Attorney, Agent, or Firm* — Kubota & Basol LLP

(57) ABSTRACT

Touch electrode architectures for reducing the occurrence of negative pixels in mutual capacitance touch sensor panels that are caused by poorly grounded objects are disclosed. A touch electrode architecture can utilize mutual capacitance unit cells, each of which include a drive electrode, a sense electrode, and one or more ground bars. The one or more ground bars can provide an increased capacitive path to ground for a poorly grounded finger, which can result in a larger reduction in mutual capacitance between the drive and sense electrodes, improving touch detection. In addition, the increased capacitive coupling between the object and ground reduces the amount of charge that couples back onto nearby sense electrodes, which can reduce the negative pixel that can occur at those electrodes and reduce the number of touch detection errors. The one or more ground bars can be formed in the same layer as the drive electrode.

20 Claims, 12 Drawing Sheets

(56) References Cited

U.S. PATENT DOCUMENTS

| | | | |
|---|---|---|---|
| 9,817,528 B2 * | 11/2017 | Hu | G06F 3/0445 |
| 9,823,784 B2 | 11/2017 | Sleeman et al. | |
| 9,881,200 B2 * | 1/2018 | Liu | G06F 3/0445 |
| 9,927,926 B2 * | 3/2018 | Peng | G06F 3/04166 |
| 10,055,068 B2 * | 8/2018 | Ding | G06F 3/0443 |
| 10,095,349 B2 | 10/2018 | Han et al. | |
| 10,235,002 B2 * | 3/2019 | Church | G06F 3/047 |
| 10,592,057 B1 * | 3/2020 | Tan | G06F 3/0414 |
| 10,936,135 B2 * | 3/2021 | Gourevitch | G06F 3/0443 |
| 10,990,229 B2 | 4/2021 | Gogte et al. | |
| 11,036,341 B1 | 6/2021 | Gourevitch et al. | |
| 2013/0100038 A1 * | 4/2013 | Yilmaz | G06F 3/0443 |
| | | | 345/173 |
| 2018/0314331 A1 | 11/2018 | Doll et al. | |

* cited by examiner

APPARATUS TO REDUCE NEGATIVE PIXEL FROM CAPACITIVE TOUCH

CROSS-REFERENCE TO RELATED APPLICATIONS

This application claims priority to U.S. Provisional Application No. 63/376,421, filed Sep. 20, 2022, the entire disclosure of which is hereby incorporated by reference in its entirety for all purposes.

FIELD OF THE DISCLOSURE

This relates generally to touch sensor panels, and more particularly to touch electrode architectures for reducing the occurrence of so-called "negative pixels" in mutual capacitance touch sensor panels that are caused by poorly grounded or ungrounded objects in proximity to the touch surface.

BACKGROUND OF THE DISCLOSURE

Many types of input devices are presently available for performing operations in a computing system, such as buttons or keys, mice, trackballs, joysticks, touch sensor panels, touch screens and the like. Touch sensor panels and touch screens, in particular, are popular because of their ease and versatility of operation as well as their declining price. Capacitive touch sensor panels can be formed from a matrix of conductive plates (e.g., touch electrodes) made of materials such as copper, silver, conductive polymers, metal mesh, graphene, nanowires (e.g., silver nanowires) or nanotubes (e.g., carbon nanotubes). Capacitive touch sensor panels can also be formed from a substantially transparent material such as Indium Tin Oxide (ITO). It is due in part to their substantial transparency that some capacitive touch sensor panels can be overlaid on a display to form a touch screen. The display can be a liquid crystal display (LCD), light emitting diode (LED) display or organic light emitting diode (OLED) display that can be positioned partially or fully behind the touch sensor panel so that a touch-sensitive surface of the touch screen can cover at least a portion of the viewable area of the display device. Some touch screens can be formed by at least partially integrating touch sensing circuitry into a display pixel stack-up (i.e., the stacked material layers forming the display pixels).

Touch panels and touch screens can allow a user to perform various functions by touching the touch sensor panel or touch screen using a finger, stylus or other object at a location. In the case of touch screens, those locations are often dictated by a user interface (UI) being displayed by the display device. In general, touch panels and touch screens can recognize a touch and the position of the touch on the touch sensor panel, and the computing system can then interpret the touch in accordance with the position of the touch (and in the case of a touch screen in accordance with the display appearing at the time of the touch), and thereafter perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels detect a touch, or a near-touch, of a proximate object by detecting the effect of capacitive coupling between the object and the touch electrodes. When the object is well-grounded, the capacitive coupling can couple charge to ground through the object. In the case of mutual capacitance touch sensing, this coupling of charge to ground reduces the mutual capacitance between the drive electrode and the sense electrode of a touch pixel, and this reduction in mutual capacitance can be detected and recognized as a touch by sensing circuitry. However, when the object is poorly grounded or ungrounded, there can be less of a capacitive path to ground through the object. As a result, there is less shunting of charge to ground through the object, and a smaller reduction in mutual capacitance between the drive and sense electrode than with a well-grounded object. Because there is a smaller reduction in mutual capacitance, it can be more difficult to detect the presence of the object. In addition, when a poorly grounded or ungrounded object is located over multiple mutual capacitance touch pixels, such as when two fingers are touching the touch panel, charge that would have been coupled to ground (in the case of a well-grounded object) can instead couple back onto a nearby sense electrode, creating a so-called "negative pixel" at that location due to the unexpected increase in charge at that nearby sense electrode. The decreased touch detection capability and the negative pixels that can result from a poorly grounded or ungrounded object can lead to touch detection errors.

BRIEF SUMMARY OF THE DISCLOSURE

This relates generally to touch sensor panels, and more particularly to touch electrode architectures for reducing the occurrence of so-called "negative pixels" in mutual capacitance touch sensor panels that are caused by poorly grounded or ungrounded objects in proximity to the touch surface. In some examples, a touch electrode architecture can utilize mutual capacitance unit cells or touch pixels, each of which include a drive electrode, a sense electrode, and one or more ground bars. The one or more ground bars can provide an increased capacitive path to ground for a poorly grounded or ungrounded object such as a finger, which can result in a larger reduction in mutual capacitance between the drive and sense electrodes when the object is proximate a touch electrode, improving touch detection. In addition, the increased capacitive coupling between the object and ground reduces the amount of charge that couples back onto nearby sense electrodes, which can reduce the negative pixel that can occur at those electrodes and reduce the number of touch detection errors. In some examples, the one or more ground bars can be formed in the same layer as the drive electrode. The unit cell touch electrodes can be designed such that when multiple unit cells are employed in an array, they can abut each other, and continuous rows of drive electrodes, continuous columns of sense electrodes, and continuous row and/or column ground bars can be formed.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch sensor panels, and more particularly to touch electrode architectures for reducing the occurrence of so-called "negative pixels" in mutual capacitance touch sensor panels that are caused by poorly grounded or ungrounded objects in proximity to the touch surface. In some examples, a touch electrode architecture can utilize mutual capacitance unit cells or touch pixels, each of which include a drive electrode, a sense electrode, and one or more ground bars. The one or more ground bars can provide an increased capacitive path to ground for a poorly grounded or ungrounded object such as a finger, which can result in a larger reduction in mutual capacitance between the drive and sense electrodes when the object is proximate a touch electrode, improving touch detection. In addition, the increased capacitive coupling between the object and ground reduces the amount of charge that couples back onto nearby sense electrodes, which can reduce the negative pixel that can occur at those electrodes and reduce the number of touch detection errors. In some examples, the one or more ground bars can be formed in the same layer as the drive electrode. The unit cell touch electrodes can be designed such that when multiple unit cells are employed in an array, they can abut each other, and continuous rows of drive electrodes, continuous columns of sense electrodes, and continuous row and/or column ground bars can be formed.

Figure 1A:
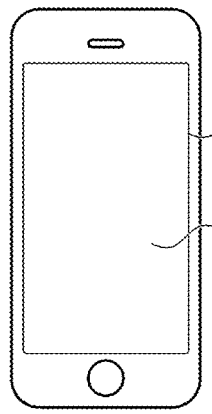
FIGS. 1A-1E illustrate example systems that can include a touch electrode architecture for reducing negative pixels according to examples of the disclosure.
Figure 1B:
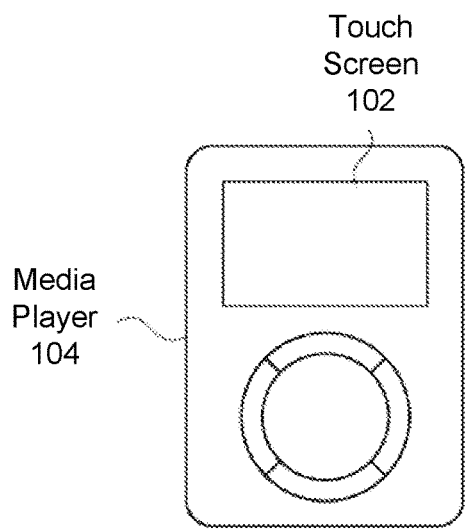
Figure 1C:
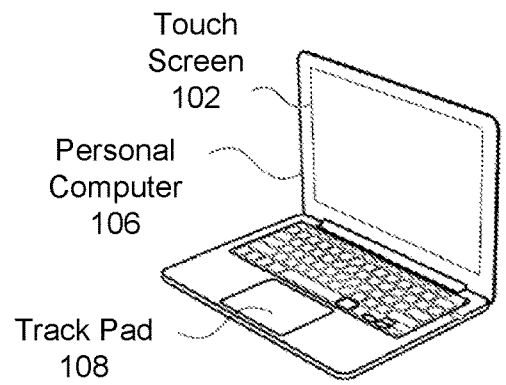
Figure 1D:
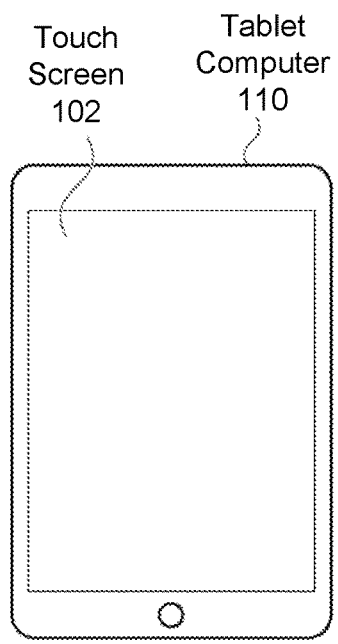
Figure 1E:
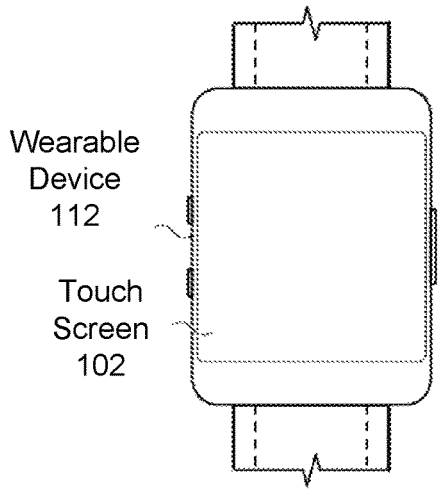

FIGS. 1A-1E illustrate example systems that can include a touch electrode architecture for reducing negative pixels according to examples of the disclosure. FIG. 1A illustrates example mobile telephone 100 that includes touch screen 102 (which includes a touch electrode architecture for reducing negative pixels) according to examples of the disclosure. FIG. 1B illustrates an example digital media player 104 that includes touch screen 102 (which includes a touch electrode architecture for reducing negative pixels) according to examples of the disclosure. FIG. 1C illustrates an example personal computer 106 that includes a touch screen 102 (which includes a touch electrode architecture for reducing negative pixels) and a trackpad 108 (which also includes a touch electrode architecture for reducing negative pixels) according to examples of the disclosure. FIG. 1D illustrates an example tablet computing device 110 that includes a touch screen 102 (which includes a touch electrode architecture for reducing negative pixels) according to examples of the disclosure. FIG. 1E illustrates an example wearable device 112 that includes a touch screen 102 (which includes a touch electrode architecture for reducing negative pixels) according to examples of the disclosure. It is understood that touch screen 102 (which includes the touch electrode architecture for reducing negative pixels) and/or trackpad 108 (which includes the touch electrode architecture for reducing negative pixels, but not a display) can be implemented in other devices as well.

In some examples, trackpad 108, along with the touch sensor panels within touch screens 102, can be based on self-capacitance. A self-capacitance-based touch system can include a matrix of small, individual plates of conductive material or groups of individual plates of conductive material forming larger conductive regions that can be referred to as touch electrodes or as touch node electrodes (as described below with reference to FIG. 4B). For example, a touch sensor panel can include a plurality of individual touch electrodes, each touch electrode identifying or representing a unique location (e.g., a touch node) on the touch sensor panel at which touch or proximity is to be sensed, and each touch node electrode being electrically isolated from the other touch node electrodes in the touch sensor panel. Such a touch sensor panel can be referred to as a pixelated self-capacitance touch sensor panel, though it is understood that in some examples, the touch node electrodes on the touch sensor panel can be used to perform scans other than self-capacitance scans on the touch sensor panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch sensor panel. In some examples, the touch node electrodes of a self-capacitance-based touch system can be formed from rows and columns of conductive material, and changes in the self-capacitance to ground of the rows and columns can be detected, similar to above. In some examples, a touch sensor panel can be multi-touch, single touch, projection scan, full-imaging multi-touch, capacitive touch, etc.

In some examples, trackpad 108, along with the touch sensor panels within touch screens 102, can be based on mutual capacitance. A mutual capacitance-based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance-based touch system can form touch nodes from a matrix of small, individual plates of conductive material.

In some examples, trackpad 108, along with touch sensor panels within touch screens 102, can be based on mutual capacitance and/or self-capacitance. The electrodes can be arranged as a matrix of small, individual plates of conductive material (e.g., as in touch node electrodes 448 in touch screen 402 in FIG. 4A) or as drive lines and sense lines (e.g., as in row touch electrodes 438 and column touch electrodes 440 in touch screen 402 in FIG. 4B), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
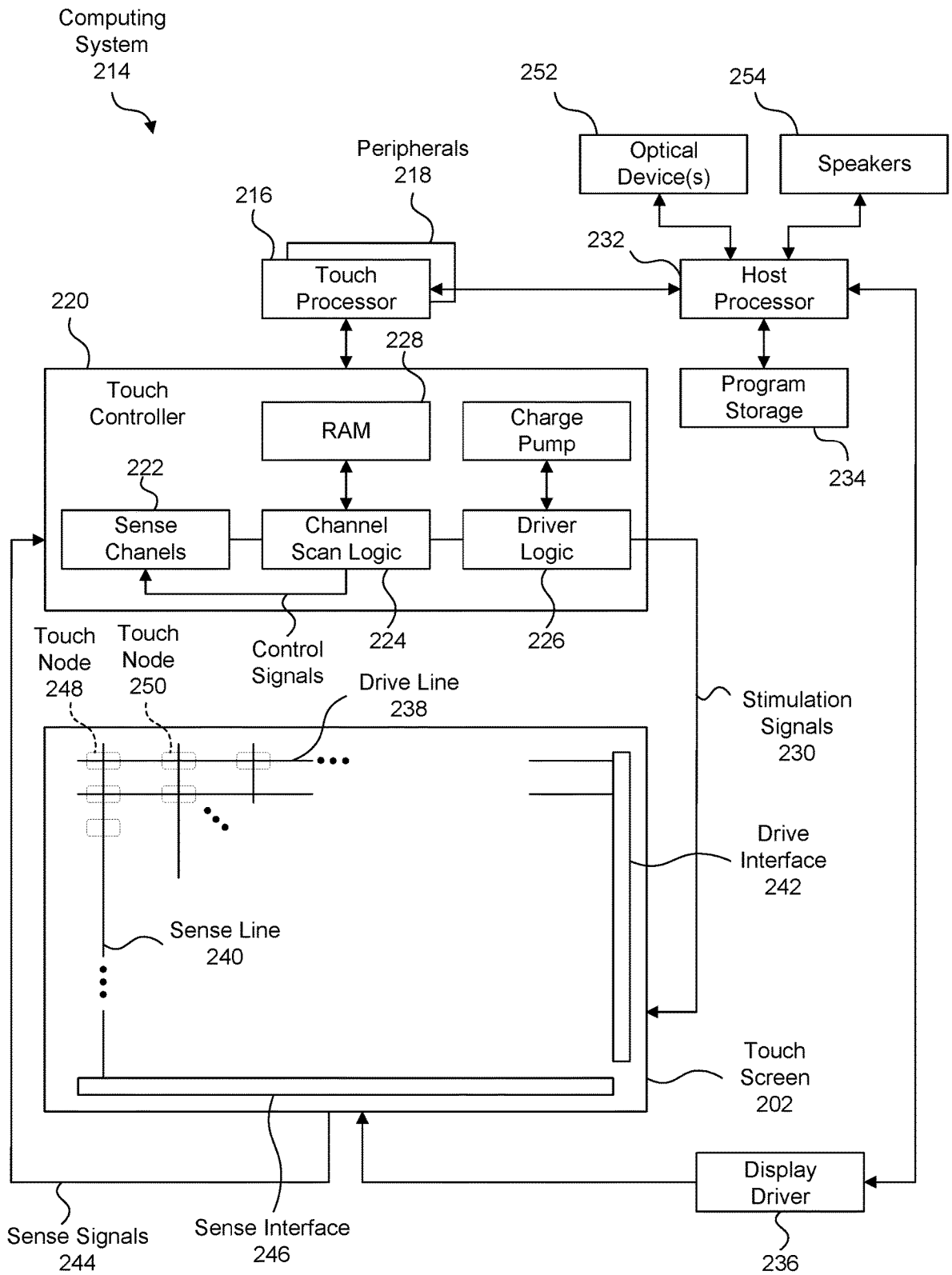
FIG. 2 illustrates an example computing system including a touch electrode architecture for reducing negative pixels according to examples of the disclosure.

FIG. 2 illustrates an example computing system including a touch electrode architecture for reducing negative pixels according to examples of the disclosure. Computing system 214 can be included in, for example, a mobile phone, tablet, touchpad, portable or desktop computer, portable media player, wearable device or any mobile or non-mobile computing device that includes a touch screen or touch sensor panel. Computing system 214 can include a touch sensing system including one or more touch processors 216, peripherals 218, a touch controller 220, and touch sensing circuitry (described in more detail below). Peripherals 218 can include, but are not limited to, random access memory (RAM) or other types of memory or storage, watchdog timers and the like. Touch controller 220 can include, but is not limited to, one or more sense channels 222, channel scan logic 224 and driver logic 226. Channel scan logic 224 can access RAM 228, autonomously read data from the sense channels and provide control for the sense channels. In addition, channel scan logic 224 can control driver logic 226 to generate stimulation signals 230 at various frequencies and/or phases that can be selectively applied to drive regions of the touch sensing circuitry of touch screen 202, as described in more detail below. In some examples, touch controller 220, touch processor 216 and peripherals 218 can be integrated into a single application specific integrated circuit (ASIC), and in some examples can be integrated with touch screen 202 itself.

It should be apparent that the architecture shown in FIG. 2 is only one example architecture of computing system 214, and that the system could have more or fewer components than shown, or a different configuration of components. In some examples, computing system 214 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware, or any combination thereof, including one or more signal processing and/or application specific integrated circuits.

Computing system 214 can include a host processor 232 for receiving outputs from touch processor 216 and performing actions based on the outputs. For example, host processor 232 can be connected to program storage 234 and a display controller/driver 236 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 236 can provide voltages on select (e.g., gate) lines to each pixel transistor and can provide data signals along data lines to these same transistors to control the pixel display image.

Host processor 232 can use display driver 236 to generate a display image on touch screen 202, such as a display image of a user interface (UI), and can use touch processor 216 and touch controller 220 to detect a touch on or near touch screen 202, such as a touch input to the displayed UI. The touch input can be used by computer programs stored in program storage 234 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 232 can also perform additional functions that may not be related to touch processing.

Note that one or more of the functions described herein can be performed by firmware stored in memory (e.g., one of the peripherals 218 in FIG. 2) and executed by touch processor 216, or stored in program storage 234 and executed by host processor 232. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 228 or program storage 234 (or both) can be a non-transitory computer readable storage medium. One or both of RAM 228 and program storage 234 can have stored therein instructions, which when executed by touch processor 216 or host processor 232 or both, can cause the device including computing system 214 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Touch screen 202, which can include a touch electrode architecture for reducing negative pixels, can be used to derive touch information at multiple discrete locations of the touch screen, referred to herein as touch nodes. Touch screen 202 can include touch sensing circuitry that can include a capacitive sensing medium having a plurality of drive lines 238 and a plurality of sense lines 240. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 238 can be driven by stimulation signals 230 from driver logic 226 through a drive interface 242, and resulting sense signals 244 generated in sense lines 240 can be transmitted through a sense interface 246 to sense channels 222 in touch controller 220. In this way, drive lines and sense lines can be part of the touch sensing circuitry that can interact to form capacitive sensing nodes, which can be thought of as touch picture elements (touch pixels) and referred to herein as touch nodes, such as touch nodes 248 and 250. This way of understanding can be particularly useful when touch screen 202 is viewed as capturing an "image" of touch ("touch image"). In other words, after touch controller 220 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 238 may be directly connected to driver logic 226 or indirectly connected to drive logic 226 via drive interface 242 and sense lines 240 may be directly connected to sense channels 222 or indirectly connected to sense channels 222 via sense interface 246. In either case an electrical path for driving and/or sensing the touch nodes can be provided.

In some examples, computing system 214 can also include one or more optical devices 252, which may also be referred to herein as optical components. In some examples, the one or more optical devices 252 can include components for light emitting and/or light sensing. In some examples, the one or more optical devices 252 can include light-emitting diodes (e.g., LEDs, OLED s, etc.), cameras, lasers (e.g., vertical-cavity surface-emitting lasers, etc.), light detectors, photodiodes, and the like. In some examples, the operation of the optical devices can be controlled by host processor 232 or an optical controller (not shown) to perform functionality using the optical devices. The functionality can include, without limitation, projecting light, imaging, proximity sensing and ranging, ambient light sensing, photography, etc., among other possibilities. In some examples, the one or more optical devices 252 can be implemented in proximity to touch screen 202 (e.g., on a periphery of or in a notch region along a perimeter of touch screen 202). As described in more detail herein, in some examples, the one or more optical devices 252 can be integrated with touch screen 202 such that light passes through one or more layers of the touch screen.

In some examples, computing system 214 can also include one or more input and/or output devices, such as speaker 254. It is understood that speaker 254 is an example input and/or output device, but other input and/or output devices are possible. In some examples, the operation of the input and/or output devices, including speaker 254, can be controlled by host processor 232 or an input/output controller (not shown) to perform functionality using the input and/or output devices. The functionality can include audio functionality for speaker 254. In some examples, the one or more input and/or output devices can be implemented in proximity to touch screen 202 (e.g., on a periphery of or in a notch region along a perimeter of touch screen 202). As described in more detail herein, in some examples, the one or more input and/or output devices can be integrated with touch screen 202. For example, integrated speaker 254 with touch screen 202, and having touch screen 202 can include an opening or one or more hole(s), can enable audio to pass through the touch screen. In some such examples, the opening(s) in the touch screen results in one or more touch electrode-free regions.

Figure 3A:
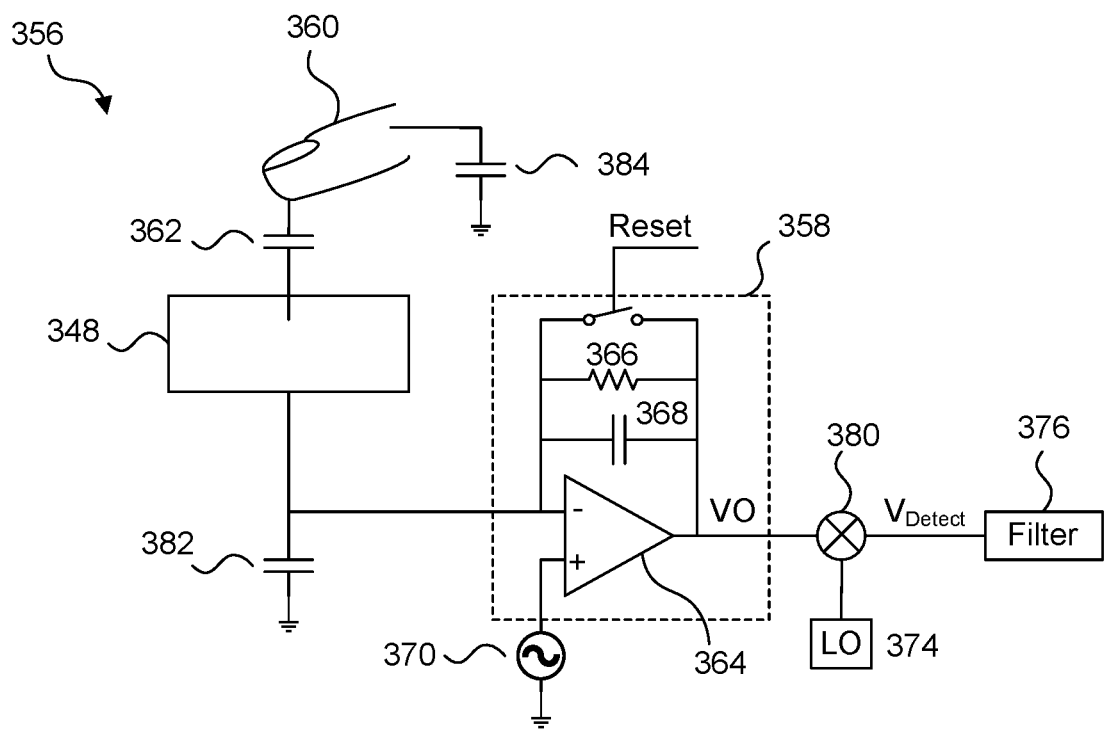
FIG. 3A illustrates an example touch sensor circuit corresponding to a self-capacitance measurement of a touch node electrode and sensing circuit according to examples of the disclosure.

FIG. 3A illustrates an example touch sensor circuit 356 corresponding to a self-capacitance measurement of a touch node electrode 348 and sensing circuit 358 according to examples of the disclosure. Touch node electrode 348 can have an inherent self-capacitance 382 to ground associated with it, and also an additional self-capacitance to ground that is formed when an object, such as finger 360, is in proximity to or touching the electrode, and is itself capacitively coupled to ground via capacitance 384. As FIG. 3A illustrates, the presence of finger 360 creates an additional capacitive path to ground (through capacitances 362 and 384) in parallel with the inherent self-capacitance 382, resulting in an increase in self-capacitance seen at touch node electrode 348. Touch node electrode 348 can be coupled to sensing circuit 358. Sensing circuit 358 can include an operational amplifier 364, feedback resistor 366 and feedback capacitor 368, although other configurations can be employed. For example, feedback resistor 366 can be replaced by a switched capacitor resistor in order to minimize a parasitic capacitance effect that can be caused by a variable feedback resistor. Touch node electrode 348 can be coupled to the inverting input (−) of operational amplifier 364. An AC voltage source 370 (V ac) can be coupled to the non-inverting input (+) of operational amplifier 364. Touch sensor circuit 356 can be configured to sense changes (e.g., increases) in the total self-capacitance 362 of the touch node electrode 348 induced by a finger or object either touching or in proximity to the touch sensor panel. The output of touch sensor circuit 356 can be used by a processor to determine the presence of a proximity or touch event, or the output can be inputted into a discrete logic network to determine the presence of a proximity or touch event.

Figure 3B:
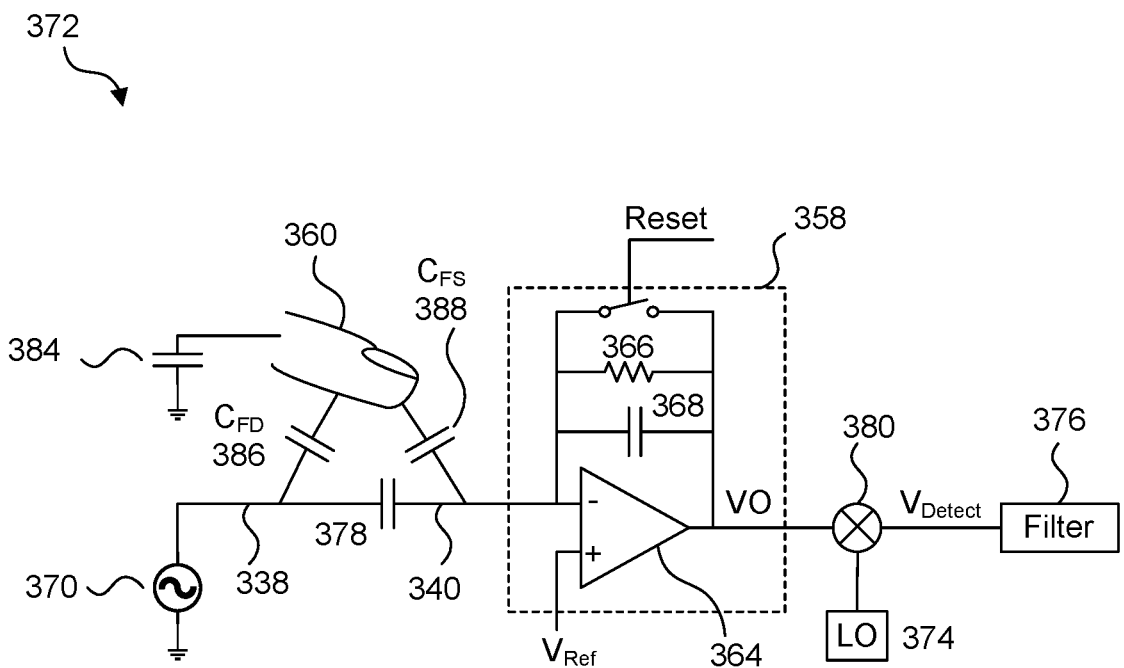
FIG. 3B illustrates an example touch sensor circuit corresponding to a mutual-capacitance drive line and sense line and sensing circuit according to examples of the disclosure.

FIG. 3B illustrates an example touch sensor circuit 372 corresponding to a mutual-capacitance drive line 338 and sense line 340 and sensing circuit 358 according to examples of the disclosure. Drive line 338 can be stimulated by a stimulation signal output from AC voltage source 370 (e.g., an AC voltage signal). The stimulation signal can be capacitively coupled to sense line 340 through mutual capacitance 378 between drive line 338 and the sense line. When an object, such as finger 360, approaches the touch node created by the intersection of drive line 338 and sense line 340, a finger-to-drive line capacitance $C_{FD}$ 386, and a finger-to-ground capacitance 384, and a finger-to-sense line capacitance $C_{FS}$ 388 is also formed. As a result, charge is coupled to ground through finger 360 rather than onto sense line 340 through $C_{FS}$ 388, and mutual capacitance 378 can change (e.g., decrease). This change in mutual capacitance 378 can be detected to indicate a touch or proximity event at the touch node, as described herein. The sense signal coupled onto sense line 340 can be received by sensing circuit 358. Sensing circuit 358 can include operational amplifier 364 and at least one of a feedback resistor 366 and a feedback capacitor 368. FIG. 3B illustrates a general case in which both resistive and capacitive feedback elements are utilized. The sense signal (referred to as Vin) can be inputted into the inverting input of operational amplifier 364, and the non-inverting input of the operational amplifier can be coupled to a reference voltage $V_{ref}$. Operational amplifier 364 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 358 can be mostly a function of the ratio of mutual capacitance 378 and the feedback impedance, comprised of resistor 366 and/or capacitor 368. The output of sensing circuit 358 Vo can be filtered and heterodyned or homodyned by being fed into multiplier 380, where Vo can be multiplied with local oscillator 374 to produce $V_{detect}$. $V_{detect}$ can be inputted into filter 376. One skilled in the art will recognize that the placement of filter 376 can be varied; thus, the filter can be placed after multiplier 380, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 380 occurs in the analog domain, output Vo may be digitized by an analog-to-digital converter (ADC), and multiplier 380, filter 376 and oscillator 374 may be implemented in a digital fashion (e.g., multiplier 380 can be a digital demodulator, filter 376 can be a digital filter, and oscillator 374 can be a digital NCO (Numerical Controlled Oscillator).

Referring back to FIG. 2, in some examples, touch screen 202 can be an integrated touch screen in which touch sensing circuit elements of the touch sensing system can be integrated into the display pixel stack-ups of a display. The circuit elements in touch screen 202 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. Additionally, as described herein, in some examples, the integrated touch screen can include optical devices and one or more high-transmittance regions corresponding to the optical devices. Additionally, as described herein, in some examples, the integrated touch screen can include one or more input and/or output devices and one or more touch-electrode free regions corresponding to the input and/or output devices (e.g., speaker hole, high-transmittance region without touch electrodes, etc.).

Figure 4A:
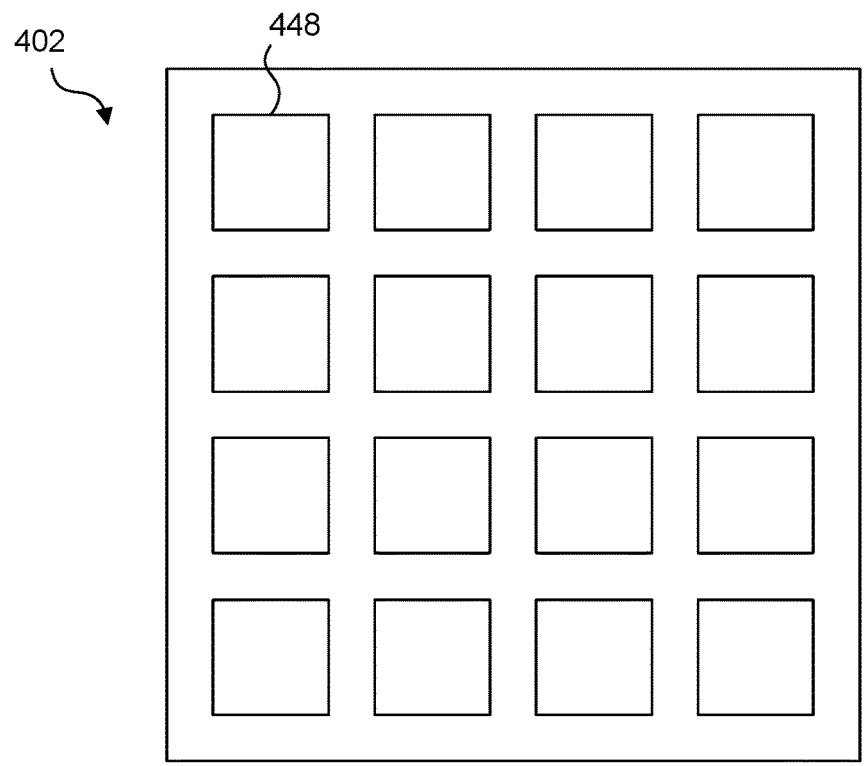
FIG. 4A illustrates a touch screen with touch node electrodes arranged in a pixelated touch node electrode configuration according to examples of the disclosure.

FIG. 4A illustrates touch screen 402 with touch node electrodes 448 arranged in a pixelated touch node electrode configuration according to examples of the disclosure. Specifically, touch screen 402 can include a plurality of individual touch node electrodes 448, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 448 can be on the same or different material layers on touch screen 402. In some examples, touch screen 402 can sense the self-capacitance of touch node electrodes 448 to detect touch and/or proximity activity on touch screen 402, and in some examples, touch screen 402 can sense the mutual capacitance between touch node electrodes 448 to detect touch and/or proximity activity on touch screen 402.

Figure 4B:
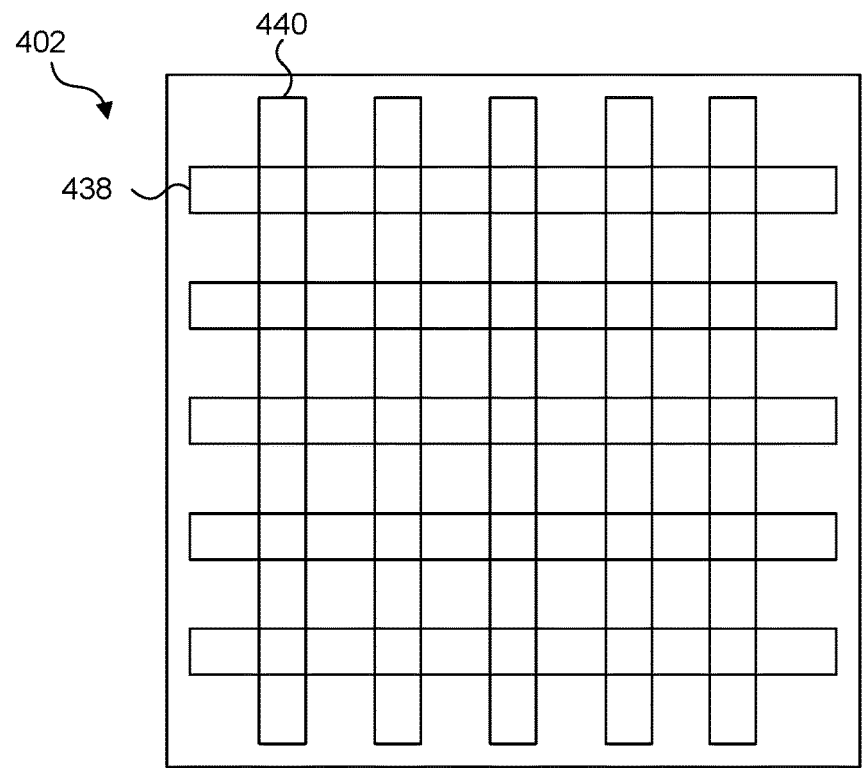
FIG. 4B illustrates a touch screen with touch electrodes arranged in rows and columns according to examples of the disclosure.

FIG. 4B illustrates touch screen 402 with touch electrodes 438 and 440 arranged in rows and columns according to examples of the disclosure. Specifically, touch screen 402 can include a plurality of touch electrodes 438 disposed as rows, and a plurality of touch electrodes 440 disposed as columns. Touch electrodes 438 and touch electrodes 440 can be on the same or different material layers on touch screen 402, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, the touch electrodes can be formed on the same layer, and may be referred to herein as a single-sided sensor. In some examples, touch screen 402 can sense the self-capacitance of touch electrodes 438 and 440 to detect touch and/or proximity activity on touch screen 402, and in some examples, touch screen 402 can sense the mutual capacitance between touch electrodes 438 and 440 to detect touch and/or proximity activity on touch screen 402.

When the architecture of FIG. 4B is configured for mutual capacitance sensing (as shown in FIG. 3B), but an object is poorly grounded or ungrounded, there can be less of a capacitive path to ground through the object. As a result, there is less shunting of charge to ground through the object, and a smaller reduction in mutual capacitance between the drive and sense electrode than with a well-grounded object. Because of this smaller reduction in mutual capacitance, it can be more difficult to detect the presence of the object. In addition, when a poorly grounded or ungrounded object is located over multiple mutual capacitance touch pixels, such as when two fingers are touching the touch panel, charge that would have been coupled to ground (in the case of a well-grounded object) can instead couple back onto a nearby sense electrode, creating a so-called "negative pixel" at that location due to the unexpected increase in charge at that nearby sense electrode. The decreased touch detection capability and the negative pixels that can result from a poorly grounded or ungrounded object can lead to touch detection errors.

Figure 5:
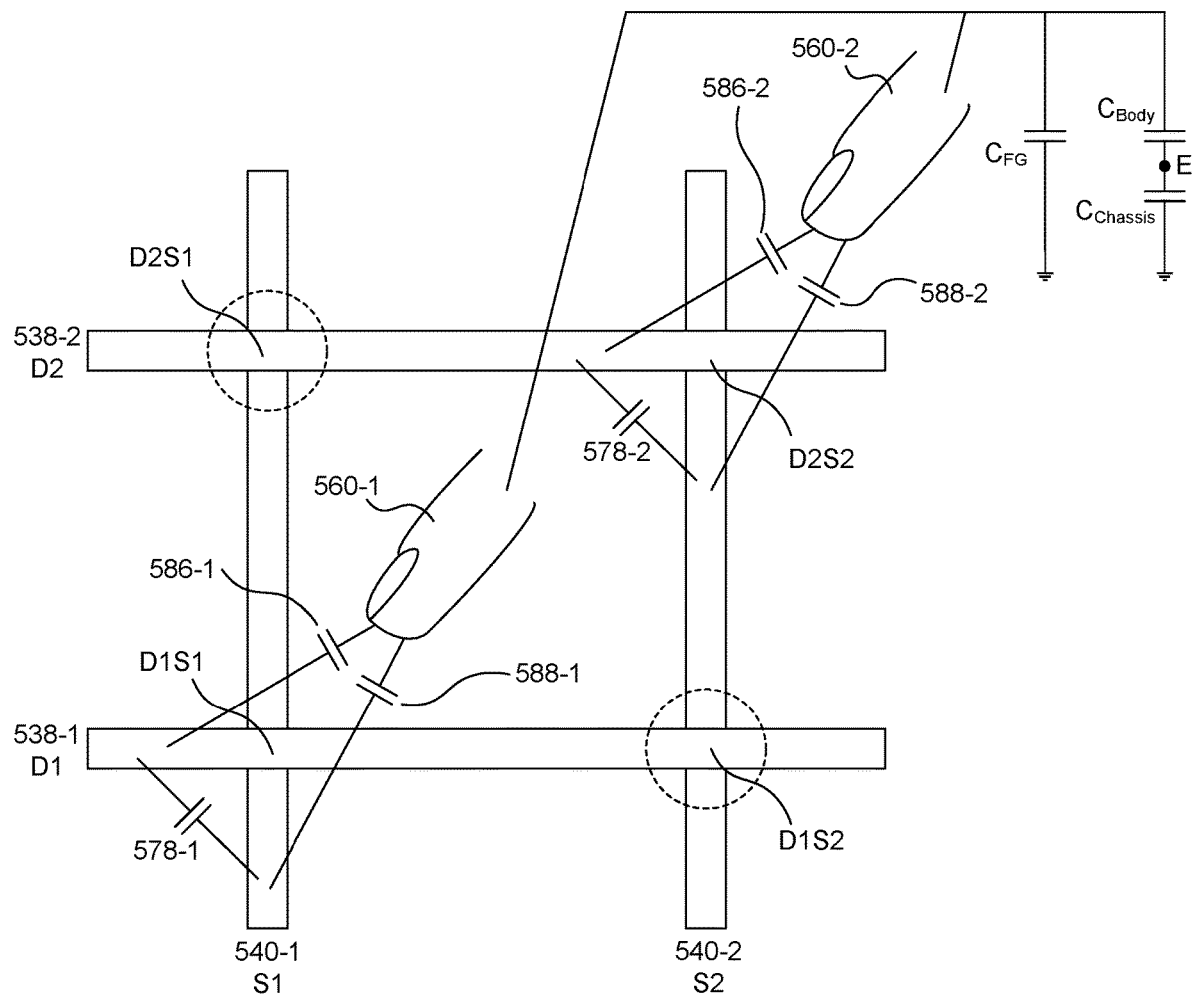
FIG. 5 is a symbolic circuit diagram of negative pixels being created at two mutual capacitance touch electrodes due to the touching of two fingers of a poorly grounded hand according to some examples of this disclosure.

FIG. 5 is a symbolic circuit diagram of negative pixels being created at two mutual capacitance touch electrodes due to the touching of two fingers of a poorly grounded hand according to some examples of this disclosure. In the example of FIG. 5, two drive lines D1 and D2 (538-1 and 538-2) and two sense lines S1 and S2 (540-1 and 540-2) intersect (without making direct electrical contact) to form four mutual capacitance touch pixels, D1S1, D1S2, D2S1 and D2S2. A mutual capacitance $C_{SIG\_SENSE}$ (578-1) is formed at D1S1 when drive line D1 is stimulated, and a mutual capacitance $C_{SIG\_SENSE}$ (578-2) is formed at D2S2 when drive line D2 is stimulated. Note that $C_{SIG\_SENSE}$ is the reduced capacitance between the drive line and sense line due to the finger. Finger 560-1 is proximate to D1S1 and finger 560-2 is proximate to D2S2. A finger-to-drive capacitance $C_{FD}$ (586-1) forms between drive line 538-1 and finger 560-1, and a finger-to-sense capacitance $C_{FS}$ (588-1) forms between finger 560-1 and sense line 540-1. In addition, a finger-to-drive capacitance $C_{FD}$ (586-2) forms between drive line 538-2 and finger 560-2, and a finger-to-sense capacitance $C_{FS}$ (588-2) forms between finger 560-2 and sense line 540-2.

In the example of FIG. 5, both fingers 560-1 and 560-2 are from the same hand of a user. If the user is well-grounded, when drive line D1 (538-1) is stimulated, charge from D1 is shunted to ground through finger 560-1 via $C_{FD}$ (586-1), and sense line S1 (540-1) sees a decrease in coupled charge and a decrease in mutual capacitance 578-1 at mutual capacitance touch pixel D1S1. Similarly, when drive line D2 (538-2) is stimulated, charge from D2 is shunted to ground through finger 560-2 via $C_{FD}$ (586-2), and sense line S2 (540-2) sees a decrease in coupled charge and a decrease in mutual capacitance 578-2 at mutual capacitance touch pixel D2S2. No negative pixels are generated.

However, if the user is poorly grounded, a small capacitance $C_{FG}$ between the finger of the user and ground is nevertheless still present, a capacitance $C_{BODY}$ between the body of the user and earth ground (symbolically shown as "E" in FIG. 5) is present. A capacitance $C_{CHASSIS}$ between the chassis of the device and earth ground completes the loop of charge flow. When drive line D1 (538-1) is stimulated, rather than charge from D1 being shunted to ground through finger 560-1 via $C_{FD}$ (586-1), charge is coupled back onto sense line S1 (540-1) via $C_{FS}$ (588-1), and onto sense line S2 (540-2) via $C_{FS}$ (588-2). Sense line S1 therefore sees less of a decrease in the mutual capacitance $C_{SIG\_SENSE}$ (578-1) than when a well-grounded touch is present, which can falsely indicate a lesser amount of touch, or no touch at all. Sense line S2 (540-2) sees an increase in charge and an increase in mutual capacitance (e.g., a so-called "negative pixel") at mutual capacitance touch pixel D1S2, even though no finger is present at that touch pixel. Similarly, when drive line D2 (538-2) is stimulated, rather than charge from D2 being shunted to ground through finger 560-2 via $C_{FD}$ (586-2), charge is coupled back onto sense line S1 (540-1) via $C_{FS}$ (588-1). Sense line S2 (540-2) therefore sees less of a decrease in the mutual capacitance $C_{SIG\_SENSE}$ (578-2) than when a well-grounded touch is present, which can falsely indicate a lesser amount of touch, or no touch at all. Sense line S1 (540-1) sees an increase in charge and an increase in mutual capacitance (a negative pixel) at mutual capacitance touch pixel D2S1, even though no finger is present at mutual capacitance touch pixel D2S1.

In some examples, negative pixels can lead to errors in palm rejection. For example, when a user inadvertently places a palm on a trackpad, a palm rejection algorithm can disregard those palm touches as being inadvertent touches. However, because of negative pixels, a palm splitting effect can occur, wherein instead of being recognized as a single palm, the palm touches can be interpreted as multiple fingers or objects. Because the touches are not recognized as a palm touch and disregarded, the touches can be recognized as valid separate touches, and errors such as false tracking can occur. Conversely, because of negative pixels, two separate (but closely spaced) finger touches can be incorrectly recognized as a palm, and can be improperly disregarded.

Figure 6A:
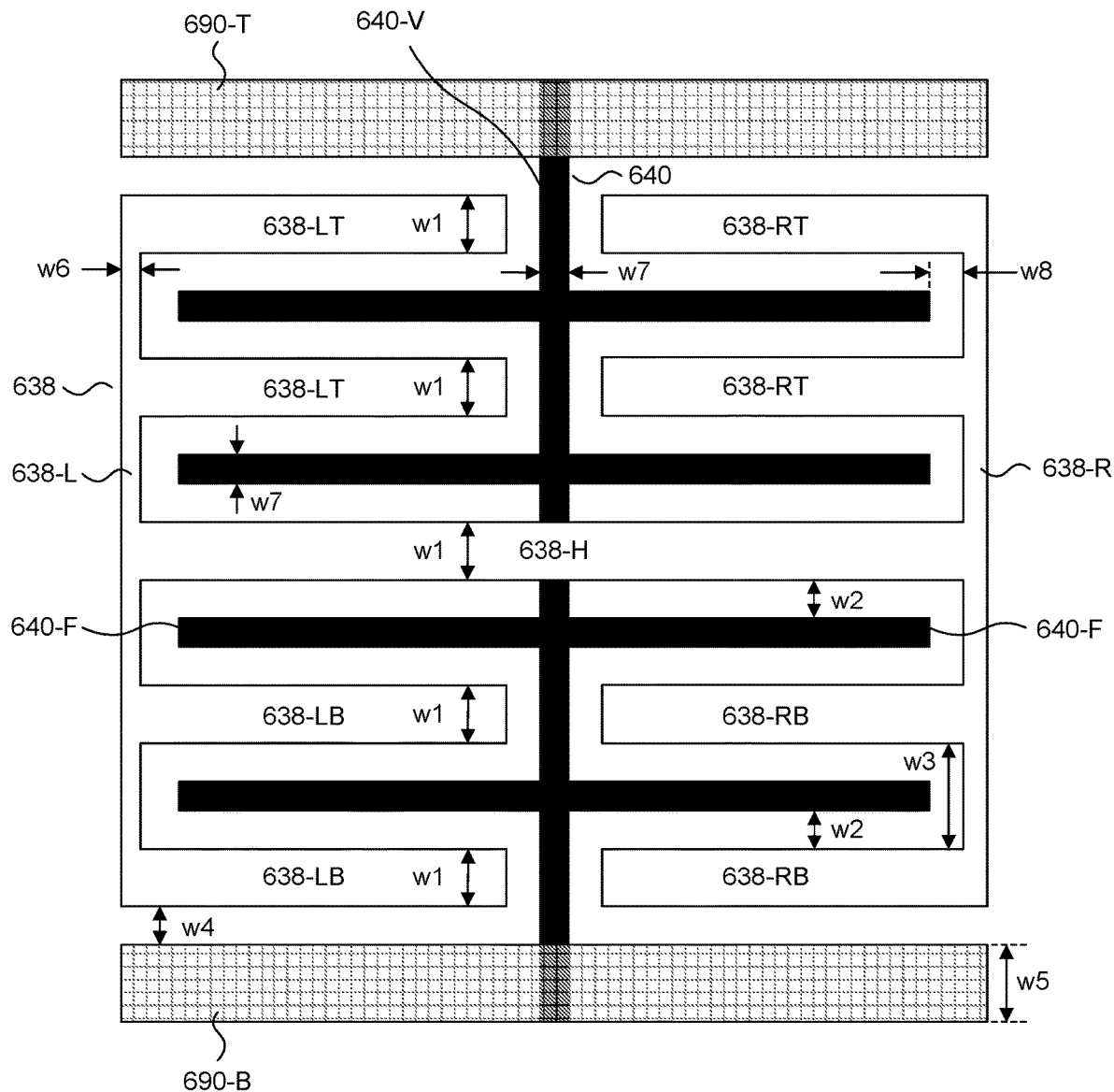
FIG. 6A illustrates a unit cell of a touch pixel architecture that can be replicated to form a mutual capacitance touch sensor panel according to some embodiments of the disclosure.

FIG. 6A illustrates a unit cell of a touch pixel architecture that can be replicated to form a mutual capacitance touch sensor panel according to some embodiments of the disclosure. In the example of FIG. 6A, drive electrode 638 includes left drive spine 638-L, two left top drive ribs 638-LT, two left bottom drive ribs 638-LB, right drive spine 638-R, two right top drive ribs 638-RT, two right bottom drive ribs 638-RB, and one horizontal drive connector 638-H, all continuously formed on a single drive layer of conductive material. Sense electrode 640 includes one vertical sense spine 640-V and eight sense fingers 640-F continuously formed on a single sense layer of conductive material that is located at lower (or different) level of the touch sensor panel stackup. The sense fingers 640-F extend horizontally from vertical sense spine 640-V and are interleaved between horizontal drive connector 638-H, the left top drive ribs 638-LT, the left bottom drive ribs 638-LB, the right top drive ribs 638-RT, and the right bottom drive ribs 638-RB. The area in the center with the interleaved ribs, connectors and fingers can be referred to herein as the active mutual capacitive sensing area due to the fringing electric fields that form between the drive electrode and the sense electrode. In addition, top ground bar 690-T and bottom ground bar 690-B are formed above the topmost left top drive rib 638-LT and the topmost right top drive rib 638-RT, and below the bottommost left bottom drive rib 638-LB and the bottommost right bottom drive rib 638-RB, respectively, along a perimeter of the active mutual capacitance sensing area. Note that the electric fields between drive electrode 638 and sense electrode 640, which form $C_{SIG\_SENSE}$, are important for mutual capacitance sensing. Therefore, top ground bar 690-T and bottom ground bar 690-B are formed at the outmost top and bottom edges of the unit cell, outside of the center area, so as not to disrupt $C_{SIG\_SENSE}$, and yet are adjacent to the top and bottom drive ribs to increase the capacitive coupling between the drive line and the ground bars.

In some examples, top ground bar 690-T and bottom ground bar 690-B are formed on the same drive layer as drive electrode 638 but are not directly electrically coupled to drive electrode 638. However, in other examples, top ground bar 690-T and bottom ground bar 690-B could also be formed on the sense layer. In some examples, drive layer 638, top ground bar 690-T and bottom ground bar 690-B are formed on the layer closer to the touch surface than the sense layer, so that the ground bars can more easily capacitively couple to a proximate object. In addition, placing top ground bar 690-T and bottom ground bar 690-B on the layer closer to the touch surface can advantageously decrease the inherent drive-to-ground capacitance $C_{DG}$, particularly when a system ground is located on a lower layer of the touch sensor panel stackup.

In one example, the width w1 of the drive ribs and horizontal drive connector 638-H can be 300 microns (although in other examples the widths of the drive ribs and horizontal drive connector can be different), the gap w2 between the fingers 640-F and the drive ribs or horizontal drive connector 638-C can be 295.5 microns, the gap w3 between two drive ribs can be 622.5 microns, the gap w4 between a ground bar 690 and an adjacent drive rib can be 160 microns, and the ground width w5 can be 500 microns (note that this is the width of a ground bar in a unit cell; when the unit cell of FIG. 6A is clustered into an array of unit cells, the total width of the ground bar can be 1000 microns due to two ground bars from adjacent cells being merged together). In addition, the width w6 of the drive spine can be 75 microns (note that this is the width of a drive spine in a unit cell; when the unit cell of FIG. 6A is clustered into an array of unit cells, the total width of the drive spine can be 150 microns due to two drive spines from adjacent cells being merged together), the width w7 of a sense finger 640-F or vertical sense spine 640-V can be 105 microns, and the distance w8 between the end of a finger 640-F and a drive spine can be 225 microns. However, it should be understood that other dimensions fall within the scope of the disclosure. In general, the widths of the drive ribs, the sense fingers, the ground bars, and the gaps between all of these structures can be adjusted to optimize touch detection while minimizing negative pixels.

Figure 6B:
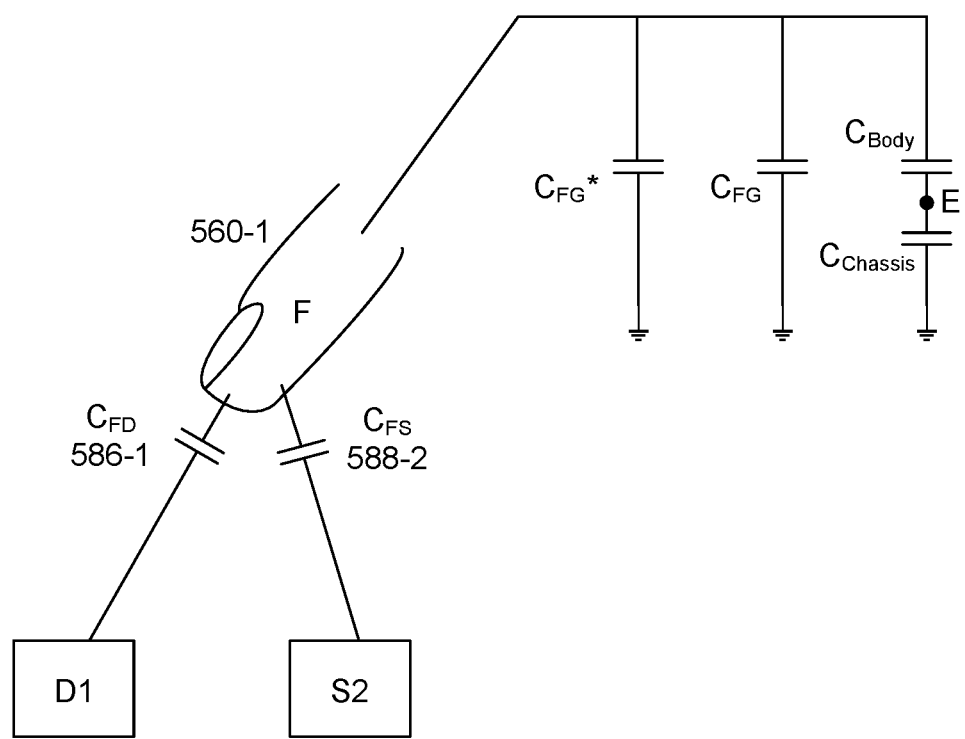
FIG. 6B illustrates a reduced circuit model of a poorly grounded finger in proximity to mutual capacitance touch pixels as shown in FIG. 5, where the touch pixels are unit cells of the example architecture shown in FIG. 6A according to some embodiments of the disclosure.

FIG. 6B illustrates a reduced circuit model of a poorly grounded finger in proximity to mutual capacitance touch pixels D1S2 and D2S2 as shown in FIG. 5, where the touch pixels are unit cells of the example architecture shown in FIG. 6A according to some embodiments of the disclosure. In the example of FIG. 6B, a finger-to-drive capacitance $C_{FD}$ (586-1) forms between drive line D1 (538-1) and finger F (560-1), and a finger-to-sense capacitance $C_{FS}$ (588-2) forms between finger F (560-2) and sense line S2 (540-2). Because the fingers are poorly grounded, a small capacitance $C_{FG}$ between the finger of the user and ground is present, a capacitance $C_{BODY}$ between the body of the user and earth ground is present, and a capacitance $C_{CHASSIS}$ between the chassis of the device and earth ground completes the loop. $C_{CHASSIS}$ depends on system dimensions, as is fixed for a given system.

However, the addition of top and bottom ground bars 690-T and 690-B as shown in FIG. 6A provides several benefits. First, some of the electric field lines emanating from drive line D1 (538-1) are intercepted by top and bottom ground bars 690-T and 690-B, resulting in some charge coupling directly to ground and a reduction in the capacitive coupling from drive to finger, $C_{FD}$. Second, an additional capacitive path to ground $C_{FG}^*$ is created due to the capacitive coupling of the fingers to the ground bars. The additional capacitive path from the finger to ground through the ground bars can be dependent on the size and location of the ground bars. The increased finger-to-ground capacitance $C_{FG}^*$ provided by the capacitive path allows for charge to be shunted through the finger to ground, which can create a greater decrease in the mutual capacitance between drive line D1 (538-1) and sense line S1 (540-1), making touch detection easier and more accurate. Third, the shunting of charge to ground through $C_{FG}^*$ decreases the amount of charge coupled back onto sense line S1 (540-1 and sense line S2 (540-2), and decreases the negative pixel formed at touch pixel D1S2. In summary, top and bottom ground bars 690-T and 690-B allow for the reduction in $C_{FD}$, an increase in $C_{FG}^*$, and a decrease in $C_{FS}$, all of which can contribute to improved touch detection and a reduction in negative pixels. With improved touch detection and decreased negative pixels, palm rejection and other functions can performed more accurately.

An example negative pixel percentage for the touch pixel D1S2 can be computed as:

$$Negative pixel(\%) = \frac{-100 C_{D1S2}}{C_{SIGSense} - C_{D1S2}} \quad (1)$$

where:

$$C_{D1S2} = \frac{C_{FD} C_{FS}}{C_{FD} + C_{FS} + C_{FG}}, \quad (2)$$

and $C_{D1S2}$ is the total capacitive coupling between drive line D1 and sense line S2 through the finger (that takes into account the new capacitive path to ground created by ground bars 690-T and 690-B), $C_{SIGSense}$ is the mutual capacitance between drive line D1 and sense line S1, $C_{FD}$ is the finger-to-drive (D1) capacitance, $C_{FS}$ is the finger-to-sense (S2) capacitance, and $C_{FG}^*$ is the additional capacitive path from the finger to ground created by ground bars 690-T and 690-B. As can be seen from Equation (1), $C_{D1S2}$ should be small to minimize the negative pixel percentage. As Equation (2) illustrates, in order to minimize $C_{D1S2}$, either $C_{FD}$ and $C_{FS}$ can be minimized, or $C_{FG}^*$ (the new capacitive path to ground) can be maximized. However, because $C_{FD}$ and $C_{FS}$ are small values, $C_{FG}^*$ will dominate.

With reference to the example dimensions provided in FIG. 6A, various adjustments to some of these dimensions can have a beneficial effect on certain key parameters, as will be demonstrated in the examples presented below.

Figure 6C:
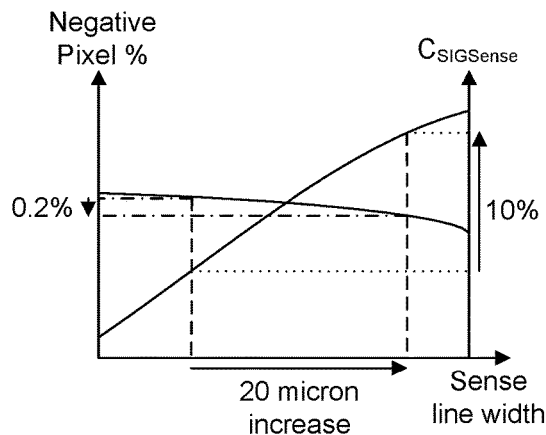
FIG. 6C illustrates a plot of negative pixel % and $C_{SIGSense}$ versus sense line width according to some embodiments of the disclosure.

FIG. 6C illustrates a plot of negative pixel % and $C_{SIGSense}$ versus sense line width (w7 in FIG. 6A) according to some embodiments of the disclosure. The example plot of FIG. 6C generally illustrates that for approximately a 20 micron increase in sense line width w7, about a 10% increase in $C_{SIGSense}$ can be achieved (which can beneficially increase the SNR of the sense signal), with a corresponding decrease in negative pixel % of about 0.2%. With reference to Equation (1), the addition of ground bars 690-T and 690-B can decrease the negative pixel %, but if any regression in $C_{SIGSense}$ is observed, the sense width w7 can be increased to counteract the regression in $C_{SIGSense}$.

Figure 6D:
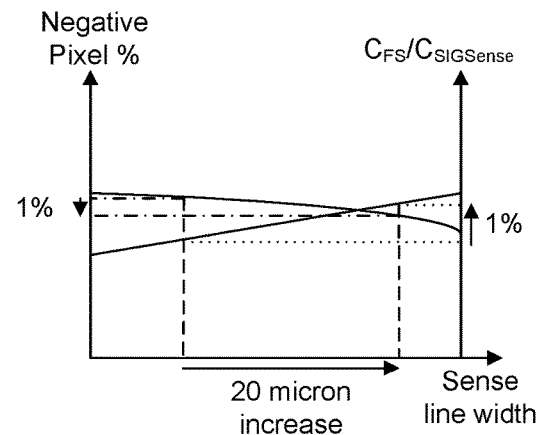
FIG. 6D illustrates a plot of negative pixel % and $C_{FS}/C_{SIGSense}$ versus sense line width according to some embodiments of the disclosure.

FIG. 6D illustrates a plot of negative pixel % and $C_{FS}/C_{SIGSense}$ versus sense line width (w7 in FIG. 6A) according to some embodiments of the disclosure. The example plot of FIG. 6D generally illustrates that for approximately a 20 micron increase in sense line width w7, about a 1% increase in $C_{FS}/C_{SIGSense}$ can be achieved, with a corresponding decrease in negative pixel % of about 1%. In some examples, a general rule can be employed to limit the ratio $C_{FS}/C_{SIGSense}$ to be below five. Thus, if $C_{FS}/C_{SIGSense}$ is trending towards five, the sense line width w7 can be decreased to counteract the increase in $C_{FS}/C_{SIGSense}$ and keep it below five.

Figure 6E:
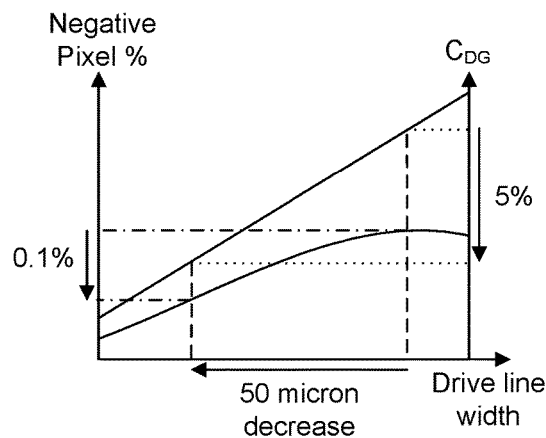
FIG. 6E illustrates a plot of negative pixel % and the drive-to-ground capacitance $C_{DG}$ versus drive line width according to some embodiments of the disclosure.

FIG. 6E illustrates a plot of negative pixel % and the drive-to-ground capacitance $C_{DG}$ versus drive line width (w1 in FIG. 6A) according to some embodiments of the disclosure. The example plot of FIG. 6E generally illustrates that for approximately a 50 micron decrement in drive line width, about a 5% reduction in $C_{DG}$ can be achieved, with a corresponding decrease in negative pixel % of about 0.1%. In some examples, a general rule can be employed to limit $C_{DG}$ to not more than 100 pF. Thus, if $C_{DG}$ is trending towards 100 pF, the drive line width w1 can be decreased to counteract the increase in $C_{DG}$ and keep it below 100 pF.

Figure 6F:
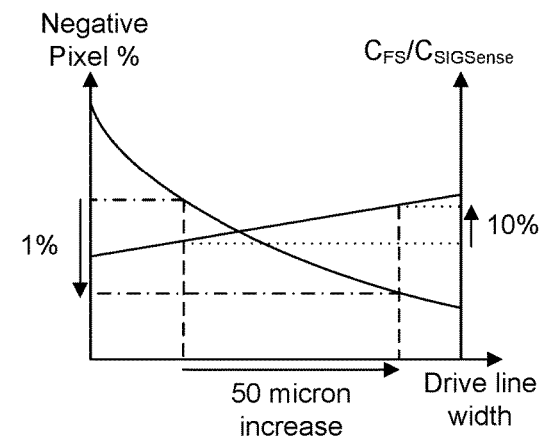
FIG. 6F illustrates a plot of negative pixel % and $C_{FS}/C_{SIGSense}$ versus drive line width according to some embodiments of the disclosure.

FIG. 6F illustrates a plot of negative pixel % and $C_{FS}/C_{SIGSense}$ versus drive line width (w1 in FIG. 6A) according to some embodiments of the disclosure. The example plot of FIG. 6F generally illustrates that for approximately a 50 micron increase in drive line width w1, about a 10% increase in $C_{FS}/C_{SIGSense}$ can be achieved, with a corresponding decrease in negative pixel % of about 1%. In some examples, a general rule can be employed to limit the ratio $C_{FS}/C_{SIGSense}$ to be below five. Thus, if $C_{FS}/C_{SIGSense}$ is trending towards five, the drive line width w1 can be decreased to counteract the increase in $C_{FS}/C_{SIGSense}$ and keep it below five.

Figure 6G:
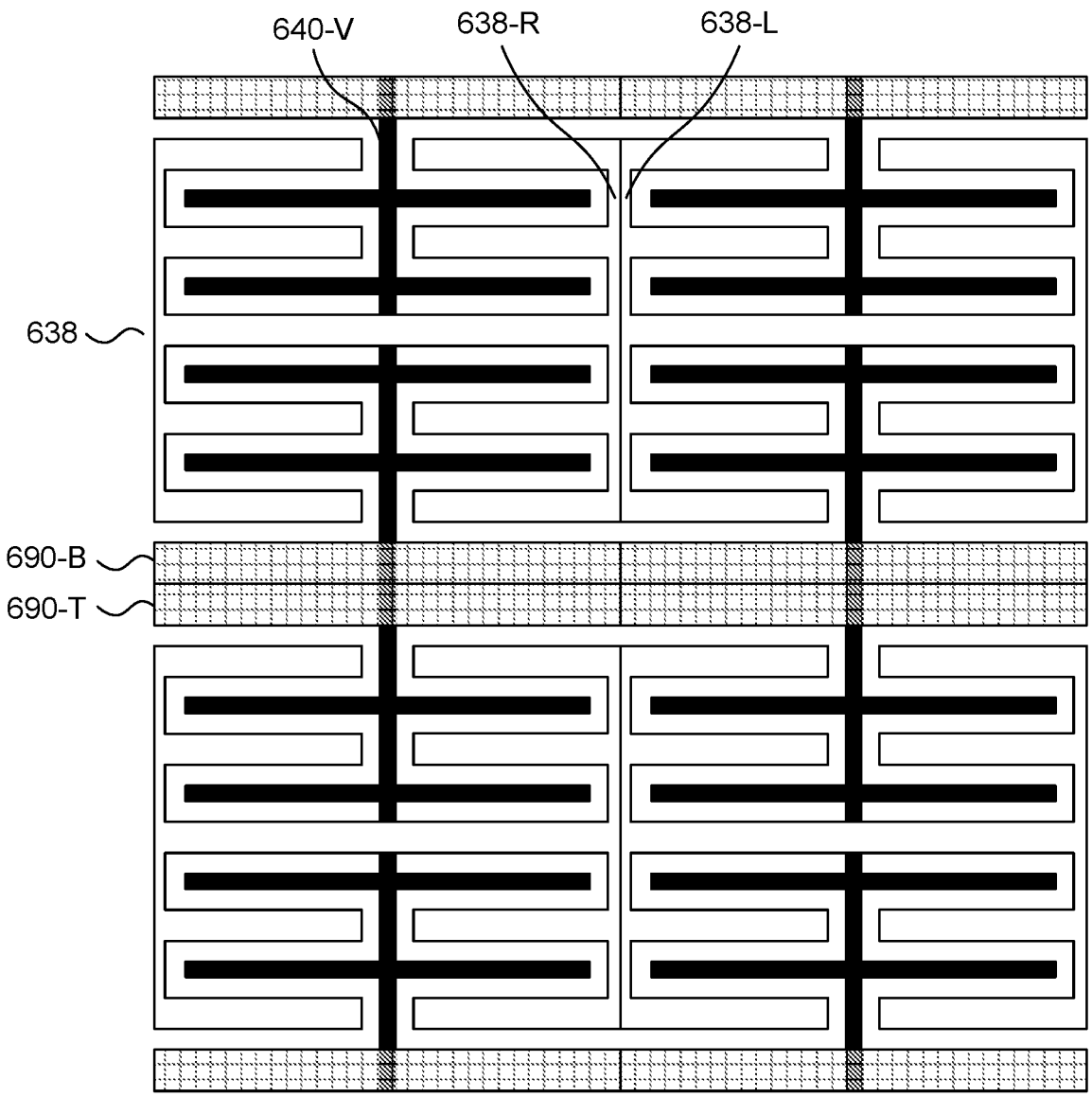
FIG. 6G illustrates four clustered unit cells of the example architecture shown in FIG. 6A that have been replicated and arranged to form a portion of a mutual capacitance touch sensor panel according to some embodiments of the disclosure.

FIG. 6G illustrates four clustered unit cells of the example architecture shown in FIG. 6A that have been replicated and arranged to form a portion of a mutual capacitance touch sensor panel according to some embodiments of the disclosure. In the example of FIG. 6G, the right drive spine 638-R and left drive spine 638-L of the drive electrodes 638 of two different unit cells are merged together when two unit cells are arranged side-by-side during fabrication, creating a continuous drive electrode that is connected horizontally across the mutual capacitance touch sensor panel. In addition, the bottom ground bar 690-B and top ground bar 690-T of two different unit cells are merged together when two unit cells are stacked vertically during fabrication. It can be envisioned from FIG. 6G that when an two-dimensional array of until cells are formed to create a touch sensor panel, a plurality of continuous ground bars are formed horizontally across the panel. The vertical sense spines 640-V of two vertically stacked unit calls can also be merged together, creating a continuous sense electrode that is connected vertically across the mutual capacitance touch sensor panel.

Figure 6H:
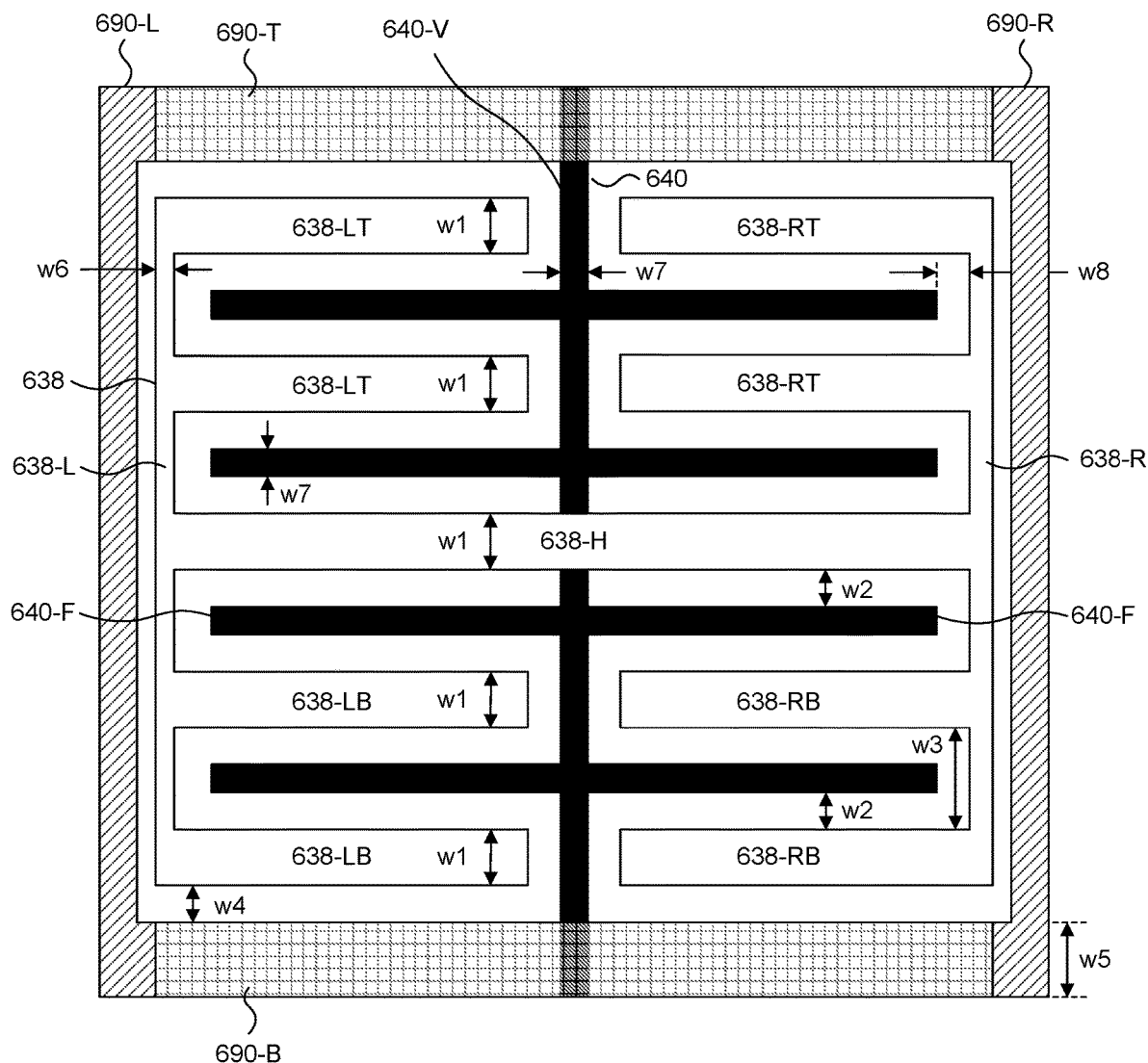
FIG. 6H illustrates a unit cell of an alternative touch pixel architecture that can be replicated to form a mutual capacitance touch sensor panel according to some embodiments of the disclosure.

FIG. 6H illustrates a unit cell of an alternative touch pixel architecture that can be replicated to form a mutual capacitance touch sensor panel according to some embodiments of the disclosure. FIG. 6H is similar to FIG. 6A, except that left ground bar 690-L and right ground bar 690-R have been added to the left and right sides of the unit cell. In some examples, left ground bar 690-L and right ground bar 690-R are formed on drive layer 638 (along with top ground bar 690-T and bottom ground bar 690-B) but are not directly electrically coupled to drive electrode 638. However, in other examples, left ground bar 690-L and right ground bar 690-R could also be formed on the sense layer. In some examples, drive layer 638, left ground bar 690-L and right ground bar 690-R are formed on the layer closer to the touch surface than the sense layer, so that the ground bars can more easily capacitively couple to a proximate object. In addition, placing left ground bar 690-L and right ground bar 690-R on the layer closer to the touch surface can advantageously decrease the inherent drive-to-ground capacitance $C_{DG}$, particularly when a system ground is located on a lower layer of the touch sensor panel stackup.

Figure 6I:
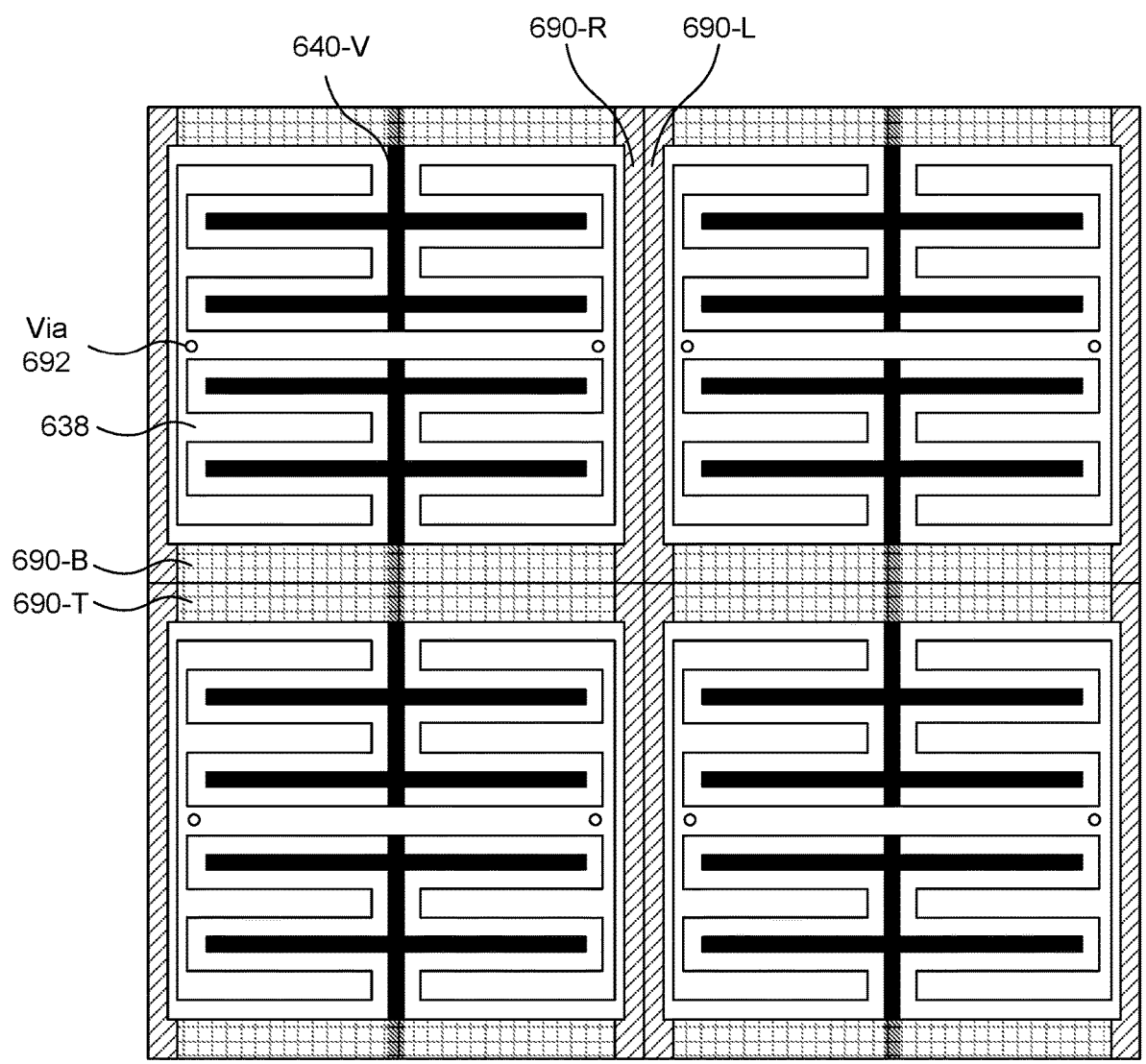
FIG. 6I illustrates four clustered unit cells of the example architecture shown in FIG. 6H that have been replicated and arranged to form a portion of a mutual capacitance touch sensor panel according to some embodiments of the disclosure.

FIG. 6I illustrates four clustered unit cells of the example architecture shown in FIG. 6H that have been replicated and arranged to form a portion of a mutual capacitance touch sensor panel according to some embodiments of the disclosure. In the example of FIG. 6I, the right ground bar 690-R, left ground bar 690-L, top ground bar 690-T and bottom ground bar 690-B of the clustered unit cells are merged together, creating a ground ring around each mutual capacitance sensor (drive electrode and sense electrode) that is connected horizontally and vertically across the mutual capacitance touch sensor panel as a lattice. The vertical sense spines 640-V of two vertically stacked unit calls can also be merged together, creating a continuous sense electrode that is connected vertically across the mutual capacitance touch sensor panel. Note, however, that in the embodiment of FIG. 6I, the left and right ground bars 690-L and 690-R block the drive electrodes 638 of adjacent unit cells from being merged together (as shown in FIG. 6C, for example). Thus, in some examples of the disclosure, the drive electrodes 638 include vias 692 to provide a conductive pathway to a different layer, so that connections between the drive electrodes 638 in two unit cells arranged side-by-side can be made while bypassing left and right ground bars 690-L and 690-R.

Figure 7:
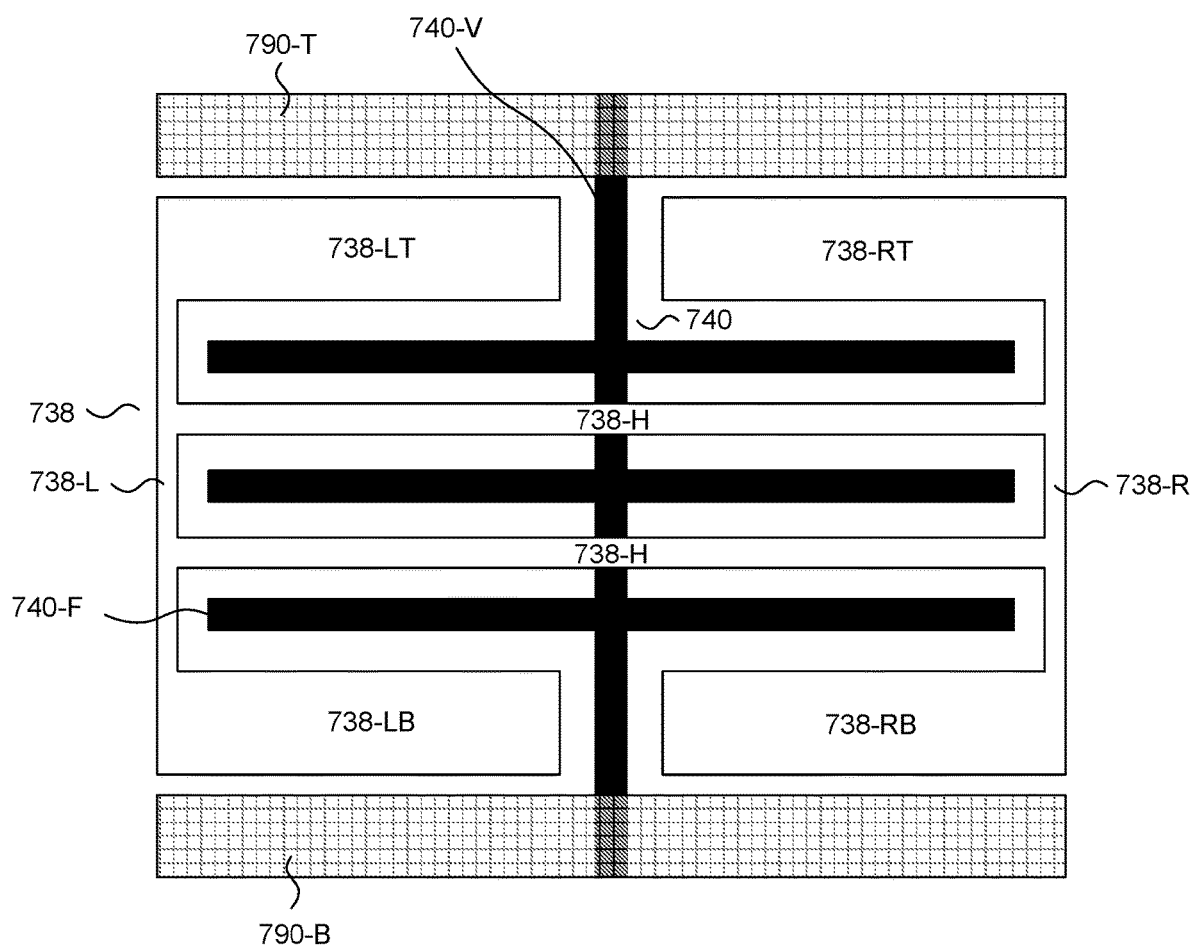
FIG. 7 illustrates a unit cell of an alternative touch pixel architecture that can be replicated to form a mutual capacitance touch sensor panel according to some embodiments of the disclosure.

FIG. 7 illustrates a unit cell of an alternative touch pixel architecture that can be replicated to form a mutual capacitance touch sensor panel according to some embodiments of the disclosure. In the example of FIG. 7, drive electrode 738 includes left drive sense spine 738-L, left top drive rib 738-LT, left bottom drive rib 738-LB, right drive sense spine 738-R, right top drive rib 738-RT, right bottom drive rib 738-RB, and two horizontal drive connectors 738-H, all continuously formed on a single drive layer of conductive material. Sense electrode 740 includes one vertical spine 740-V and six sense fingers 740-F continuously formed on a single sense layer of conductive material that is located at a lower (or different) level of the touch sensor panel stackup. The sense fingers 740-F extend horizontally from vertical spine 740-V and are interleaved between the two horizontal drive connectors 738-H, the left top drive rib 738-LT, the left bottom drive rib 738-LB, the right top drive rib 738-RT, and the right bottom drive rib 738-RB. In addition, top ground bar 790-T and bottom ground bar 790-B are formed above left top drive rib 738-LT and right top drive rib 738-RT, and below left bottom drive rib 738-LB and right bottom drive rib 738-RB, respectively. Note that the electric fields between drive electrode 738 and sense electrode 740, which form $C_{SIGSENSE}$, are important for mutual capacitance sensing. Therefore, top ground bar 790-T and bottom ground bar 790-B are formed at the outmost top and bottom edges of the unit cell, outside of the center area, so as not to disrupt $C_{SIGSense}$, and yet are adjacent to the top and bottom drive ribs to increase the capacitive coupling between the drive line and the ground bars.

In some examples, top ground bar 790-T and bottom ground bar 790-B are formed on the same drive layer as drive electrode 738 but are not directly electrically coupled to drive electrode 738. However, in other examples, top ground bar 790-T and bottom ground bar 790-B could also be formed on the sense layer. In some examples, drive layer 738, top ground bar 790-T and bottom ground bar 790-B are formed on the layer closer to the touch surface than the sense layer, so that the ground bars can more easily capacitively couple to a proximate object. In addition, placing top ground bar 790-T and bottom ground bar 790-B on the layer closer to the touch surface can advantageously decrease the inherent drive-to-ground capacitance $C_{DG}$, particularly when a system ground is located on a lower layer of the touch sensor panel stackup. Although not shown in FIG. 7, in some examples of the disclosure left and right ground bars can be added to the architecture in a manner similar to that shown in FIG. 6H. Also, the unit cell of FIG. 7 can be arranged in an array of unit cells, such that the ground bars, the drive electrodes, and the sense electrodes of the unit cells can be electrically coupled together.

Therefore, according to the above, some examples of the disclosure are directed to a mutual capacitance touch pixel, comprising a first drive electrode formed in a first layer, the first drive electrode including a plurality of first drive spines arranged in a first direction, a plurality of first drive ribs coupled to the plurality of first drive spines in a second direction, and at least one first drive connector coupled to the plurality of first drive spines and arranged in the second direction, a first sense electrode formed in a second layer different from the first layer, the first sense electrode including a first sense spine arranged in the first direction, a plurality of first sense fingers coupled to the first sense spine in the second direction and interleaved between the plurality of first drive ribs and the at least one first drive connector to form an active mutual capacitance sensing area, and one or more first ground bars formed in the first layer in the second direction along a portion of a perimeter of the active mutual capacitance sensing area. Additionally or alternatively to one of more of the examples disclosed above, in some examples the plurality of first drive spines are routed along the perimeter of the active mutual capacitance sensing area and positioned to be electrically couplable to a drive spine of an adjacent mutual capacitance touch pixel. Additionally or alternatively to one of more of the examples disclosed above, in some examples the first sense spine extends to the perimeter of the active mutual capacitance sensing area and is positioned to be electrically couplable to a sense spine of an adjacent mutual capacitance touch pixel. Additionally or alternatively to one of more of the examples disclosed above, in some examples the one or more first ground bars are routed along a top and bottom side of the active mutual capacitance sensing area, each first ground bar positioned to be electrically couplable to a ground bar of an adjacent mutual capacitance touch pixel. Some examples of the disclosure are directed to a touch sensor panel comprising an array of mutual capacitance touch pixels according to one or more of the examples disclosed above, the array of mutual capacitance touch pixels having their first ground bars electrically coupled together to form a continuous ground bar extending along a width of the touch sensor panel. Additionally or alternatively to one of more of the examples disclosed above, in some examples the mutual capacitance touch pixel further comprises one or more second ground bars formed in the first layer in the first direction and coupled to the one or more first ground bars. Additionally or alternatively to one of more of the examples disclosed above, in some examples the one or more second ground bars are routed along a left and right side of the active mutual capacitance sensing area, each second ground bar positioned to be electrically couplable to a ground bar of an adjacent mutual capacitance touch pixel. Additionally or alternatively to one of more of the examples disclosed above, in some examples the one or more first ground bars and the one or more second ground bars form a ring around the active mutual capacitance sensing area. Some examples of the disclosure are directed to a touch sensor panel comprising an array of mutual capacitance touch pixels according to one or more of the examples disclosed above, the array of mutual capacitance touch pixels having their first and second ground bars electrically coupled to the ground bars of the other mutual capacitance touch pixels to form a ground lattice around the mutual capacitance touch pixels. Additionally or alternatively to one of more of the examples disclosed above, in some examples the first layer is arranged to be closer to a touch surface of the touch pixel than the second layer.

Some examples of the disclosure are directed to a unit cell mutual capacitance touch electrode, comprising a drive electrode formed on a first layer and having a plurality of drive ribs, a sense electrode formed on a second layer and having a plurality of fingers interleaved with the plurality of drive ribs to form a mutual capacitance sensing area, and a first ground bar formed on the first layer outside the mutual capacitance sensing area, wherein the drive electrode, the sense electrode, and the first ground bar in the unit cell are arranged within the unit cell to be electrically couplable with the drive electrode, the sense electrode, and the first ground bar of a plurality of other unit cells to form a mutual capacitance sensing array. Additionally or alternatively to one of more of the examples disclosed above, in some examples the unit cell mutual capacitance touch electrode further comprises a second ground bar coupled to the first ground bar and formed on the first layer outside the mutual capacitance sensing area. Additionally or alternatively to one of more of the examples disclosed above, in some examples the first layer is arranged to be closer to a touch surface of the touch electrode than the second layer.

Some examples of the disclosure are directed to a mutual capacitance touch sensor panel, comprising, a plurality of mutual capacitance touch pixels, each mutual capacitance touch pixel including a first drive electrode formed in a first layer, the first drive electrode including a plurality of first drive spines arranged in a first direction, a plurality of first drive ribs coupled to the plurality of first drive spines in a second direction, and at least one first drive connector coupled to the plurality of first drive spines and arranged in the second direction, a first sense electrode formed in a second layer different from the first layer, the first sense electrode including a first sense spine arranged in the first direction, a plurality of first sense fingers coupled to the first sense spine in the second direction and interleaved between the plurality of first drive ribs and the at least one first drive connector to form an active mutual capacitance sensing area, and one or more first ground bars formed in the first layer in the second direction along a portion of a perimeter of the active mutual capacitance sensing area. Additionally or alternatively to one of more of the examples disclosed above, in some examples the plurality of first drive spines within each mutual capacitance touch pixel are routed along the perimeter of the active mutual capacitance sensing area and electrically coupled to a drive spine of an adjacent mutual capacitance touch pixel. Additionally or alternatively to one of more of the examples disclosed above, in some examples the first sense spine of each mutual capacitance touch pixel extends to the perimeter of the active mutual capacitance sensing area and electrically coupled to a sense spine of an adjacent mutual capacitance touch pixel. Additionally or alternatively to one of more of the examples disclosed above, in some examples the one or more first ground bars of each mutual capacitance touch pixel are routed along a top and bottom side of the active mutual capacitance sensing area and electrically coupled to a first ground bar of an adjacent mutual capacitance touch pixel. Additionally or alternatively to one of more of the examples disclosed above, in some examples the electrically coupled first ground bars of adjacent mutual capacitance touch pixels form a continuous ground bar extending along a width of the touch sensor panel. Additionally or alternatively to one of more of the examples disclosed above, in some examples each mutual capacitance touch pixel further includes one or more second ground bars formed in the first layer in the first direction and coupled to the one or more first ground bars. Additionally or alternatively to one of more of the examples disclosed above, in some examples the one or more second ground bars within each mutual capacitance touch pixel are routed along a left and right side of the active mutual capacitance sensing area and electrically coupled to a second ground bar of an adjacent mutual capacitance touch pixel. Additionally or alternatively to one of more of the examples disclosed above, in some examples the one or more first ground bars and the one or more second ground bars form a lattice around the active mutual capacitance sensing area of the plurality of mutual capacitance touch pixels. Additionally or alternatively to one of more of the examples disclosed above, in some examples the first layer is arranged to be closer to a touch surface of the touch sensor panel than the second layer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A mutual capacitance touch pixel, comprising:
   a first drive electrode formed in a first layer, the first drive electrode including a plurality of first drive spines arranged in a first direction, a plurality of first drive ribs coupled to the plurality of first drive spines in a second direction, and at least one first drive connector coupled to the plurality of first drive spines and arranged in the second direction;
   a first sense electrode formed in a second layer different from the first layer, the first sense electrode including a first sense spine arranged in the first direction;
   a plurality of first sense fingers coupled to the first sense spine in the second direction and interleaved between the plurality of first drive ribs and the at least one first drive connector to form an active mutual capacitance sensing area; and
   one or more first ground bars formed in the first layer in the second direction along a portion of a perimeter of the active mutual capacitance sensing area.

2. The mutual capacitance touch pixel of claim 1, wherein the plurality of first drive spines are routed along the perimeter of the active mutual capacitance sensing area and positioned to be electrically couplable to a drive spine of an adjacent mutual capacitance touch pixel.

3. The mutual capacitance touch pixel of claim 1, wherein the first sense spine extends to the perimeter of the active mutual capacitance sensing area and is positioned to be electrically couplable to a sense spine of an adjacent mutual capacitance touch pixel.

4. The mutual capacitance touch pixel of claim 1, wherein the one or more first ground bars are routed along a top and bottom side of the active mutual capacitance sensing area, each first ground bar positioned to be electrically couplable to a ground bar of an adjacent mutual capacitance touch pixel.

5. A touch sensor panel including the mutual capacitance touch pixel of claim 4, the touch sensor panel comprising an array of mutual capacitance touch pixels having their first ground bars electrically coupled together to form a continuous ground bar extending along a width of the touch sensor panel.

6. The mutual capacitance touch pixel of claim 1, further comprising one or more second ground bars formed in the first layer in the first direction and coupled to the one or more first ground bars.

7. The mutual capacitance touch pixel of claim 6, wherein the one or more second ground bars are routed along a left and right side of the active mutual capacitance sensing area, each second ground bar positioned to be electrically couplable to a ground bar of an adjacent mutual capacitance touch pixel.

8. A touch sensor panel including the mutual capacitance touch pixel of claim 7, the touch sensor panel comprising an array of mutual capacitance touch pixels having their first and second ground bars electrically coupled to the ground bars of the other mutual capacitance touch pixels to form a ground lattice around the mutual capacitance touch pixels.

9. The mutual capacitance touch pixel of claim 6, wherein the one or more first ground bars and the one or more second ground bars form a ring around the active mutual capacitance sensing area.

10. The mutual capacitance touch pixel of claim 1, wherein the first layer is arranged to be closer to a touch surface of the touch pixel than the second layer.

11. A unit cell mutual capacitance touch electrode, comprising:
    a drive electrode formed on a first layer and having a plurality of drive ribs;
    a sense electrode formed on a second layer and having a plurality of fingers interleaved with the plurality of drive ribs to form a mutual capacitance sensing area; and
    a first ground bar formed on the first layer outside the mutual capacitance sensing area;
    wherein the drive electrode, the sense electrode, and the first ground bar in the unit cell are arranged within the unit cell to be electrically couplable with the drive electrode, the sense electrode, and the first ground bar of a plurality of other unit cells to form a mutual capacitance sensing array.

12. The unit cell mutual capacitance touch electrode of claim 11, further comprising:
    a second ground bar coupled to the first ground bar and formed on the first layer outside the mutual capacitance sensing area.

13. The unit cell mutual capacitance touch electrode of claim 11, wherein the first layer is arranged to be closer to a touch surface of the touch electrode than the second layer.

14. A mutual capacitance touch sensor panel, comprising:
a plurality of mutual capacitance touch pixels, each mutual capacitance touch pixel including
- a first drive electrode formed in a first layer, the first drive electrode including a plurality of first drive spines arranged in a first direction, a plurality of first drive ribs coupled to the plurality of first drive spines in a second direction, and at least one first drive connector coupled to the plurality of first drive spines and arranged in the second direction,
- a first sense electrode formed in a second layer different from the first layer, the first sense electrode including a first sense spine arranged in the first direction,
- a plurality of first sense fingers coupled to the first sense spine in the second direction and interleaved between the plurality of first drive ribs and the at least one first drive connector to form an active mutual capacitance sensing area, and
- one or more first ground bars formed in the first layer in the second direction along a portion of a perimeter of the active mutual capacitance sensing area.

15. The mutual capacitance touch sensor panel of claim 14, wherein the plurality of first drive spines within each mutual capacitance touch pixel are routed along the perimeter of the active mutual capacitance sensing area and electrically coupled to a drive spine of an adjacent mutual capacitance touch pixel.

16. The mutual capacitance touch sensor panel of claim 14, wherein the first sense spine of each mutual capacitance touch pixel extends to the perimeter of the active mutual capacitance sensing area and electrically coupled to a sense spine of an adjacent mutual capacitance touch pixel.

17. The mutual capacitance touch sensor panel of claim 14, wherein the one or more first ground bars of each mutual capacitance touch pixel are routed along a top and bottom side of the active mutual capacitance sensing area and electrically coupled to a first ground bar of an adjacent mutual capacitance touch pixel.

18. The mutual capacitance touch sensor panel of claim 17, wherein the electrically coupled first ground bars of adjacent mutual capacitance touch pixels form a continuous ground bar extending along a width of the touch sensor panel.

19. The mutual capacitance touch sensor panel of claim 14, each mutual capacitance touch pixel further including one or more second ground bars formed in the first layer in the first direction and coupled to the one or more first ground bars.

20. The mutual capacitance touch sensor panel of claim 19, wherein the one or more second ground bars within each mutual capacitance touch pixel are routed along a left and right side of the active mutual capacitance sensing area and electrically coupled to a second ground bar of an adjacent mutual capacitance touch pixel.

* * * * *